United States Patent Office 3,140,288
Patented July 7, 1964

3,140,288
CYCLODISILAZANE COMPOUNDS
John S. Peake, North Oaks, Minn., assignor to Minnesota Mining and Manufacturing Company, St. Paul, Minn., a corporation of Delaware
No Drawing. Filed Feb. 2, 1962, Ser. No. 170,829
15 Claims. (Cl. 260—288)

This invention relates to new and very useful substituted cyclodisilazane compounds and methods for making same.

More particularly, this invention relates to cyclodisilazane compounds represented by the general formula:

(1) 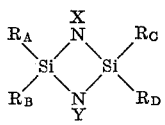

wherein the radicals X and Y may be the same or different and are each selected from the group consisting of lower alkyl, cycloalkyl containing from 5 through 11 carbon atoms each, aryl containing from 6 through 13 carbon atoms each, pyridyl and quinolyl and the radicals $R_A$, $R_B$, $R_C$ and $R_D$ may be the same or different and are each selected from the group consisting of alkyl, cylcloalkyl containing from 5 through 7 carbon atoms each, aryl containing from 6 through 13 carbon atoms each, aralkyl radicals containing from 7 through 11 carbon atoms each, alkoxyalkyl containing from 2 through 9 carbon atoms each, phenoxyphenyl containing from 12 through 18 carbon atoms each, pyridyl and quinolyl.

Preferred compounds of Formula 1 are those wherein X and Y are each selected from the group consisting of methyl, ethyl, cyclohexyl, phenyl, benzyl, tolyl, xylyl, and 2-pyridyl, and $R_A$, $R_B$, $R_C$ and $R_D$ are each selected from the group consisting of lower alkyl, cyclohexyl, phenyl, tolyl and xylyl.

Compounds of Formula 1 are useful as curing agents for epoxy resins by heating an epoxide monomer with a Formula 1 compound. The curing is sometimes hastened by the addition of ammonium sulfate to the mixture of epoxide monomer and Formula 1 compound. Their solubility in common organic solvents varies greatly with the nature of the groups $R_A$, $R_B$, $R_C$, $R_D$, X and Y. Slight solubility is observed in aromatic solvents like benzene and xylene and even less solubility is observed in alkane hydrocarbons like hexane and heptane, when X and Y are aromatic groups. These compounds do, however, readily dissolve in liquid epoxide monomers. They are also soluble in aniline. When X, Y, $R_A$, $R_B$, $R_C$ or $R_D$ are alkyl, the cyclodisilazane compounds have greatly increased solubility in common solvents.

As used in this application, the term "lower" as used before the term "alkyl" has reference to radicals which contain less than 7 carbon atoms each.

Similarly, by the term "aryl" reference is had to ring structures which contain the characteristic conjugated double bond system of aromatic hydrocarbons such as phenyl, naphthyl, biphenyl, terphenyl, and the like, including fused ring, multiple ring and single ring systems. Such radicals can be substituted by various lower alkyl groups, lower alkoxy groups, trimethylsilyl groups, triphenylsilyl groups, dialkylamino groups, or diarylamino groups; for example, tolyl, xylyl, para-methoxyphenyl, para-dimethylaminophenyl, triphenylsilyl methyl, and the like.

The term "alkyl" is used in this application in its conventional sense to mean a monovalent radical derived from an aliphatic hydrocarbon by removal of one hydrogen atom, as methyl, ethyl, propyl, or the like.

The term "cycloalkyl" is used herein in its conventional sense to indicate a monovalent radical derived from a cycloaliphatic compound by removal of one hydrogen atom, as cyclopentyl, cyclohexyl, or the like.

The term "aralkyl" is used in its conventional sense to refer to an arylated alkyl radical, such as benzyl and the like. The term "phenoxyphenyl" as used herein has reference both to the unsubstituted phenoxyphenyl and to lower alkyl substituted phenoxyphenyl radicals.

The term "pyridyl" when used in this application refers to a 6 membered heterocyclic ring structure containing one nitrogen atom in the ring. This ring structure can be substituted by various lower alkyl groups.

The term "quinolyl" when used in this application has reference to the monovalent radical $C_9H_6N-$, derived from quinoline. This ring structure can be substituted by various lower alkyl groups.

The compounds of Formula 1 can be prepared by any one of several different methods. Three methods of preparing these cyclodisilazane compounds are described herein; they are termed, respectively, the hydrosilane-amine reaction, the amine interchange reaction, and the amine condensation reaction. Each of these processes will now be described separately.

The hydrosilane-amine reaction will now be described. This reaction may be carried out in several ways illustrated by the following equations:

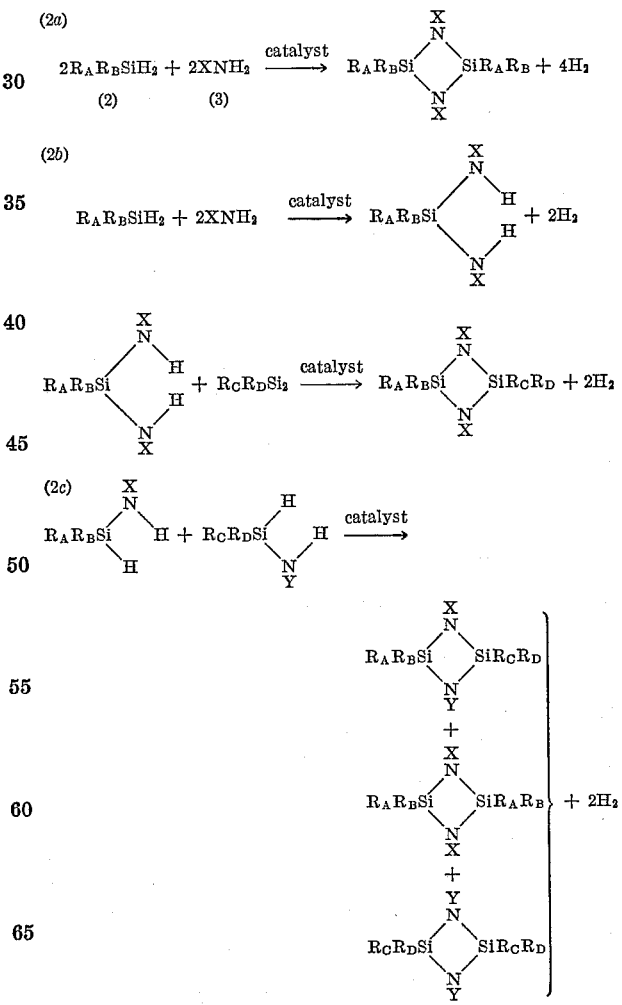

In the above equations $R_A$, $R_B$, $R_C$ and $R_D$ may be the same or different and are each selected from the group consisting of lower alkyl, cycloalkyl containing from 5 through 7 carbon atoms each, aryl containing from 6 through 13 carbon atoms each, aralkyl radicals containing from 7 through 11 carbon atoms each, phenoxyphenyl containing from 12 through 18 carbon atoms each, pyridyl and quinolyl, and X is selected from the group consisting of cyclohexyl, phenyl, benzyl, tolyl, xylyl, 2-pyridyl, and quinolyl.

The hydrosilane-amine reaction is carried out in the liquid phase by reaction of the hydrosilane and the amino compound in the presence of a catalyst. The reaction can occur either in a solution involving a solvent inert to both reagents, or in a melt in absence of solvents. Suitable inert solvents for use in this reaction are those which are in general unreactive towards either class of reactants. Obviously, when a solvent medium is employed, the upper temperature of the reaction will be somewhat controlled by the boiling point of the particular reaction mixture at the pressure employed. Suitable inert solvents for use in this reaction comprise, for example, high boiling aromatic hydrocarbons and aromatic ethers. All reagents and solvents must be thoroughly dried. Preferably, the reaction is carried out at atmospheric pressure in a dry inert or oxygen-free atmosphere, such as nitrogen, to eliminate contact of moisture or oxygen with the reaction mixture and to avoid explosions of the hydrogen by-product of the reaction.

Reaction in the absence of catalysts is extremely slow and will not proceed to completion. Accordingly, the preferred method is to add the reagents to a solvent having an atmospheric boiling point lying between 74° and 400° C., to purge the reaction vessel with an inert gas, such as nitrogen, and to add the catalyst before heating the reaction mixture. The preferred ratio of reactants is one Si–H equivalent of the hydrosilane to one N–H equivalent of the amino compound. Mole proportions of hydrosilane to amine are in general non-critical. A suitable range of mole proportions is from, say, 1:10 to 10:1, or an even greater excess of hydrosilane to amine. Excess amine reactant is to be avoided, since when excess amine is present the desired products of the invention are not the immediate major products of the reaction between the hydrosilane and the amine. Minor variations in these preferred proportions can be tolerated; but, if the ratio of N–H equivalents to Si–H equivalents reaches 2:1, the principal product will be a diaminosilane at temperatures below 200° C. However, at temperatures above 300° C. any unreacted amine may be recovered as the diaminosilane condenses to a cyclodisilazane compound. For soluble basic catalysts, such as sodium hydride or sodium amide, the preferred ratio of catalyst to reagents is in the range of from about $10^{-4}$ to $10^{-2}$ mole catalyst per equivalent weight of Si–H. For metal catalysts (heterogeneous catalysis) the preferred ratio is $10^{-2}$ to $5 \times 10^{-1}$ mole catalyst per equivalent of Si–H.

Reaction temperatures of at least 150° C. are required for formation of cyclodisilazane compounds, with the preferred range being 200°–375° C. In general, it is only necessary to heat the respective reactants to a temperature at which reaction continues to occur. However, it has been found that temperatures in the range of from about 150° C. up to the decomposition temperature of the particular amine used in a given reaction are best suited for purposes of this method. Reactions to form cyclodisilazane compounds require periods of time that are dependent upon the concentrations of the reagents. For example, a reaction between several grams each of a pure dihydrosilane and a pure amine can occur within ten minutes in the presence of the proper catalyst, whereas a reaction between the same reagents in a dilute solution or with a catalyst of low activity may require several days for completion. Preferably the reaction proceeds smoothly and not too violently initially in a solvent of a boiling point high enough (>200° C.) to allow the latter stages to proceed at a practical rate.

The reaction may occur on the surface of a metallic catalyst. Suitable metallic catalysts include copper, silver, nickel (as Raney nickel or product of reduction of nickel acetylacetonate), or platinum. Of these metals copper is preferred for heterogeneous catalysis. Homogeneous catalysis generally produces more rapid reaction than heterogeneous catalysis and is the preferred type for the hydrosilane-amine reactions. Homogeneous catalysts suitable for these reactions include certain ammono bases, such as sodium amide or lithium anilide, hydrides of Group IA Metals, such as sodium hydride or lithium hydride, Group IA Metals, such as Na, Li, or K, certain complex metal hydrides, such as LiAlH$_4$; certain organometallic compounds such as butyl lithium.

Suitable hydrosilanes for use in the process indicated by Equations 2a and 2b may be prepared by reduction of the dihalosilane with a complex metal hydride of sufficient reactivity, such as LiAlH$_4$. For example, one dihydrosilane available commercially is diphenylsilane (obtainable from Metal and Thermit Corporation).

The amines useful in this hydrosilane-amine reaction are available commercially or are prepared by conventional procedures. Specific hydrosilanes that may be used are methyldodecylsilane, dibenzylsilane, methylnaphthylsilane, di-N-butylsilane, methylcyclohexyl, silane, etc. Examples of amines that may be used are m-toluidine, 4-ethylaniline, 3-aminopyridine, p-anisidine, etc.

In carrying out the hydrosilane-amine reaction it is essential that moisture and air be excluded from the system. It is, furthermore, essential to avoid solvents having active hydrogen atoms or that will decompose at the high reaction temperatures required for completion of the formation of cyclodisilazane compounds.

The reaction can be made to proceed stepwise starting with a dihydrosilane and an amine, forming first the substituted diaminosilane at lower temperatures and subsequently reacting this at higher temperatures with the same hydrosilane or a different one to close the cyclodisilazane ring, as illustrated in the second equation under 2b above. The recovery of the product of the reaction of a hydrosilane and an aromatic amine can be accomplished by precipitating it by addition to the reaction mixture of an excess of an alkane solvent such as heptane, pentane, hexane, and the like. Or, alternatively, one may permit the reaction mixture to solidify and then may extract the solidified reaction mixture either stepwise to remove reaction solvent preferentially or with a single solvent from which the desired product may be recrystallized. A suitable apparatus for such extraction is the conventional Soxhlet extractor.

As seen from Equation 2c above, it is possible to use a hydroamino silane prepared from a hydro-monohalosilane:

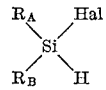

and a primary amine by reaction in an inert solvent. Such a hydroaminosilane will self-condense in the presence of a catalyst to yield a cyclodisilazane compound, since it contains the required Si–H and Si–N bonds.

A second method for preparing the cyclodisilazane compounds of the present invention is termed the amine interchange reaction. This reaction is summarized by the following equations:

(3a)

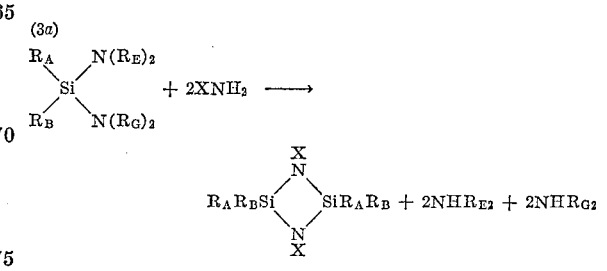

(3b)

(3c)

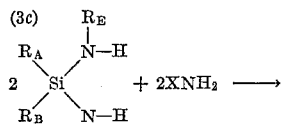

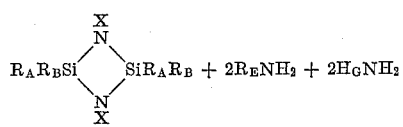

where $n=3$ or 4 in the above equations, $R_A$ and $R_B$ may be the same or different and are each selected from the group consisting of alkyl, cycloalkyl containing from 5 through 7 carbon atoms each, aryl containing from 6 through 13 carbon atoms each, aralkyl radicals containing from 7 through 11 carbon atoms each, alkoxyalkyl containing from 2 through 9 carbon atoms each, phenoxyphenyl containing from 12 through 18 carbon atoms each, pyridyl and quinolyl, and $R_E$ and $R_G$ can be the same or different and are each selected from the group consisting of hydrogen and lower alkyl, with an amine of the formula:

$$XNH_2$$

wherein X is selected from the group consisting of cyclohexyl, phenyl, benzyl, tolyl, xylyl, 2-pyridyl, and quinolyl.

This method, which has the advantage of eliminating the need for what are often expensive hydrosilane starting materials, may be employed in preparing compounds containing $R_AR_BSi$ groups; whereas the otherwise necessary corresponding hydrosilane would be so volatile as to be carried from the system by the escaping hydrogen gas. For example, amine interchange is useful in the preparation of Si, Si, Si′, Si′-tetramethyl-N,N′ diphenyl-cyclodisilazane from hexamethylcyclotrisilazane and aniline. The bis(tertiary amino) silane

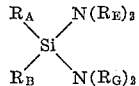

can be prepared by well-known, standard reactions of the appropriate dihalosilane, $R_AR_BSi\ Hal_2$, with the appropriate amines, $(R_E)_2NH$ or $(R_G)_2NH$. $R_E$ and $R_G$ may be the same or different. The silazane, $(R_AR_BSi\ NH)_n$, where $n=3$ or 4, can be prepared by the well-known reaction of ammonia with the appropriate dihalosilane, $R_AR_BSi\ Hal_2$. By the term "halogen-halo," "Hal" or the like, reference is had to the halogens, fluorine, chlorine, bromine or iodine.

Suitable inert solvents for use in this reaction are those which are in general unreactive towards either class of reactants. Obviously, when a solvent medium is employed the upper temperature limit of the reaction will be the boiling point of the particular reaction mixture at the pressure employed. Suitable inert solvents for use in this reaction comprise, for example, high boiling aromatic hydrocarbons and aromatic ethers.

In general, the mole proportions of bis(tertiary amino)-silane to amine is not critical. However, in general, the mole ratio of bis(tertiary amino)silane to amine will fall in the range of from about 0.1 to 10.

In general, it is only necessary to heat the respective reactants to a temperature at which reaction occurs and to remove the amine by-product of the reaction from the system. However, it has been found that temperatures in the range of from about 150° C. up to the decomposition temperature of the particular amine used in a given reaction are best suited for purposes of this method.

Another advantage of the amine interchange reaction is its ability to proceed in the absence of catalysts. The bis(tertiary amino)silane,

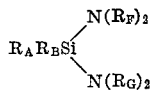

or the silazane, $(R_AR_BSiNH)_n$, used to contribute $$R_AR_BSi$$

groups to the cyclodisilazane compound is reacted with the proper amine, $XNH_2$, by heating a mixture of the two reagents either with or without a suitable high boiling solvent to temperatures in excess of 150° C., preferably between 200° and 350° C., to complete the formation of the cyclodisilazane compound. Pressures employed in this reaction may be atmospheric, but they may vary from sub-atmospheric to super-atmospheric over a range that permits the evolved amine to be removed from the reaction mixture without undue loss of the reactants.

The recovery of the product of the reaction of a silazane or a bis(tertiary amino) silane with an amine may be accomplished by addition to the reaction mixture of an excess of an alkane solvent such as heptane, pentane, hexane, and the like. Or, alternatively, one may permit the reaction mixture to solidify and then extract the solidified reaction mixture either stepwise to remove reaction solvent preferentially, or with a single solvent from which the desired product may be recrystallized. A suitable apparatus for continuous extraction is the conventional Soxhlet extractor. The reaction is preferably conducted in an oxygen-free atmosphere.

A third method for preparing the compounds of this invention, termed the amine condensation reaction, is summarized by the following generalized equation:

(4)

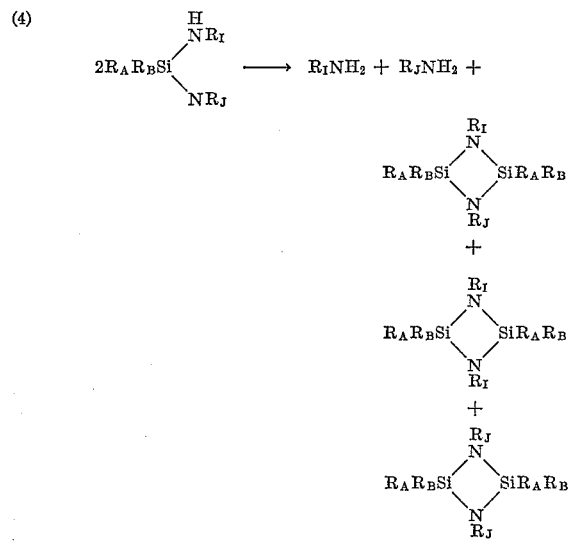

wherein $R_A$ and $R_B$ may be the same or different and are each selected from the group consisting of alkyl, cycloalkyl containing from 5 through 7 carbon atoms each, aryl containing from 6 through 13 carbon atoms each, aralkyl radicals containing from 7 through 11 carbon atoms each, alkoxyalkyl containing from 2 through 9 carbon atoms each, phenoxyphenyl containing from 12 through 18 carbon atoms each, pyridyl and quinolyl, and $R_I$ and $R_J$ are selected from the group consisting of lower alkyl and aryl containing from 6 to 13 carbon atoms each. In general, $R_I$ and $R_J$ are the same. In this event $R_I=R_J=X$.

The bis(secondary amino)silane, $R_AR_BSi(NXH)_2$, is prepared by reacting the appropriate dihalosilane, $$R_AR_BSiHal_2$$

with the appropriate amine, $XNH_2$, using techniques described in the literature. The purified bis(secondary amino)silane is then heated either alone or with a sufficiently high boiling solvent to cause condensation and to drive off the amine expelled in the process.

In general, it is only necessary to heat the reactant to a temperature at which reaction occurs. However, it has been found that temperatures in the range of from about 150° C. up to the decomposition temperature of the particular amine used in a given reaction are best suited for purposes of this method.

Suitable inert solvents for use in this reaction are those which are in general unreactive towards either class of reactants. Obviously, when a solvent medium is employed the upper temperature of the reaction will be the boiling point of the particular reaction mixture at the pressure employed. Suitable inert solvents for use in this reaction comprise, for example, high boiling aromatic hydrocarbons and aromatic ethers. Solvents suitable for use with this reaction include phenyl ether, o-diphenylbenzene, p-diphenylbenzene, biphenyl, etc. The reaction can be run at atmospheric pressure, preferably in an inert or oxygen-free atmosphere to prevent formation of oxidation products. The reaction is preferably conducted in an oxygen-free atmosphere. The reaction may take place under reduced pressure to favor the liberation of the amine, so long as the pressure is maintained high enough to prevent appreciable loss of starting material and products. Reaction times may vary from several minutes for very small batches to several hours for large ones. The amine condensation reaction requires no catalyst to cause the reaction to go to completion. The reaction is characterized by generally high yields of the cyclodisilazane compound.

The recovery of the product of the reaction of a bis (secondary amino) silane may be accomplished by addition to the reaction mixture of an excess of an alkane solvent such as heptane, pentane, hexane, and the like. Or, alternatively, one may permit the reaction mixture to solidify and then extract the solidified reaction mixture either stepwise to remove reaction solvent preferentially or with a single solvent from which the desired product may be recrystallized. A suitable apparatus for continuous extraction is the conventional Soxhlet extractor.

The invention is further illustrated by the following examples.

EXAMPLE 1

*Synthesis of N,N'-Di-(p-Tolyl)Tetraphenylcyclodisilazane*

A mixture of 153.6 parts of sublimed p-toluidine, 263 parts of diphenylsilane, 500 parts of phenyl ether, and 0.05 part of sodium hydride catalyst is heated under nitrogen atmosphere to 260° C. until evolution of hydrogen from the reaction ceases completely. The reaction mixture is allowed to cool to 200° C. and 5000 parts of heptane is added to produce a suspension. The suspension is filtered and the crystals washed with fresh heptane and then with cyclohexene. The washed and dried crystals of N,N'-di-(p-tolyl)tetraphenylcyclodisilazane melt at 328–331° C. The compound exhibits pronounced absorbance in the infrared region at the following wave-lengths ($\pm 0.1\mu$): 6.2$\mu$, 6.6$\mu$, 7.0$\mu$, 7.7$\mu$, 9.0$\mu$, 10.6$\mu$, 11.3$\mu$, 12.4$\mu$, 13.5$\mu$, 13.9$\mu$, and 14.4$\mu$. The spectrum is consistent for the structure assigned for N,N'-di-(p-tolyl)tetraphenylcyclodisilazane.

EXAMPLE 2

*Synthesis of N,N'-Di-(p-Tolyl)Tetramethylcyclodisilazane*

A mixture of 127.3 parts of octamethylcyclotetrasilazane, 186.7 parts of p-toluidine, and 500 parts of o-diphenylbenzene is heated to reflux (~330° C.) under a nitrogen atmosphere for 42 hours. Ammonia escapes from the reaction mixture and is removed in a nitrogen stream. As the mixture cools, 1500 parts of heptane are added to the mixture, precipitating crystals. These are washed with an additional 500 parts of heptane and then dried under vacuum. The crystals of impure N,N'-di-(p-tolyl)tetramethylcyclodisilazane melt over the range 153–173° C. Purification of these crystals by fractional sublimation gives a product melting at 196–197° C. The compound exhibits pronounced absorbance in the infrared region at the following wave-lengths ($\pm 0.1\mu$): 6.2$\mu$, 6.6$\mu$, 7.8$\mu$, 8.0$\mu$, 10.4$\mu$, 11.1$\mu$, 12.2$\mu$, 12.3$\mu$, and 12.7$\mu$. The spectrum is consistent for the structure of N,N'-di-(p-tolyl)tetramethylcyclodisilazane.

EXAMPLE 3

*Synthesis of N,N'-Dimethyltetraphenylcyclodisilazane*

A mixture of 24 parts of bis-(methylamino)-diphenylsilane and 50 parts of o-diphenylbenzene solvent is heated under nitrogen atmosphere to reflux (~330°) and the refluxing continued until the methylamine evolved by the reaction has been completely removed. If the reaction mixture is cooled at this stage a mixture of crystals and a viscous solution is obtained. Addition of 1100 parts of hot heptane dissolves the reaction mixture. Cooling this solution deposits crystals of N,N'-dimethyltetraphenylcyclodisilazane, M.P. 207–210° C.

*Analysis.*—Calculated for $C_{26}H_{26}N_2Si_2$: C, 73.9%; H, 6.2%; N, 6.7%. Found: C, 73.6%; H, 6.0%; N, 6.7%. The compound exhibits pronounced absorbance in the infrared region at the following wave-lengths ($\pm 0.1\mu$): 7.0$\mu$, 8.4$\mu$, 8.5$\mu$, 8.9$\mu$, 9.1$\mu$, 12.1$\mu$, 13.4$\mu$, 14.0$\mu$, and 14.3$\mu$. The spectrum is consistent for the structure of N,N'-dimethyltetraphenylcyclodisilazane. Molecular weight; calculated for $C_{26}H_{26}N_2Si_2$: 422.61. Found: (Benzene solution), 408.

EXAMPLE 4

*Synthesis of N,N',Si,Si'-Tetraphenyl-Si,Si'-Dimethyl-cyclodisilazane*

A mixture of 411.9 parts of methylphenylsilane, 314 parts of aniline, and 0.65 part of sodium hydride catalyst is heated slowly, at first, under nitrogen atmosphere and then to 280° C. to complete the reaction. When hydrogen evolution ceases, 750 parts of phenyl ether is added and the mixture allowed to cool. The mixture deposits crystals on cooling. These, upon washing with benzene and drying, melt at 279–282° C. with sublimation. Purification by sublimation raises the M.P. range to 280–284° C.

*Analysis.*—Calculated for $C_{26}H_{26}N_2Si_2$: C, 73.9%; H, 6.2%; N, 6.7%. Found: C, 74.1%; H, 6.4%; N, 6.55%. The compound exhibits pronounced absorbance in the infrared region at the following wave-lengths ($\pm 0.1\mu$): 6.3$\mu$, 6.7$\mu$, 7.7$\mu$, 8.0$\mu$, 9.0$\mu$, 10.5$\mu$, 11.2$\mu$, 12.6$\mu$, 13.2$\mu$, 13.5$\mu$, 13.8$\mu$, 14.4$\mu$, and 14.5$\mu$. The spectrum is consistent for the structure of N,N',Si,Si'-tetraphenyl-Si,Si'-dimethylcyclodisilazane.

EXAMPLE 5

*Synthesis of N,N',Si,Si-Tetraphenyl-Si',Si'-Dimethyl-cyclodisilazane*

A mixture of 28.6 parts of dimethyldianilinosilane and 21.8 parts of diphenylsilane with 0.005 part of sodium hydride catalyst is heated under nitrogen atmosphere to a temperature of 265° C. until evolution of hydrogen ceases. The reaction mixture is then cooled. Addition of 150 parts of heptane and filtration of the mixture gives 24.8 parts of a crystalline fraction of M.P. 189° C. (50 percent yield) of N,N',Si,Si-tetraphenyl-Si,Si'-dimethylcyclodisilazane. The compound exhibits pronounced absorbance in the infrared region at the following wave-lengths ($\pm 0.1\mu$): 6.3$\mu$, 6.7$\mu$, 7.7$\mu$, 8.0$\mu$, 9.0$\mu$, 9.3$\mu$, 9.7$\mu$, 10.0$\mu$, 10.5$\mu$, 11.2$\mu$, 12.7$\mu$, 13.3$\mu$, 13.5$\mu$, 14.0$\mu$, 14.4$\mu$, and 14.6$\mu$. The spectrum is consistent for the structure of N,N',Si,Si-tetraphenyl-Si',Si'-dimethylcyclodisilazane.

EXAMPLE 6

*Synthesis of Hexaphenylcyclodisilazane*

A solution made by dissolving 11.03 parts of diphenyldianilinosilane in 25 parts of o-diphenylbenzene is heated 44.5 hours under nitrogen atmosphere in a flask equipped with condensers suitable for distilling and for reflux. Aniline is distilled from the mixture as the molecules of diphenyldianilinosilane condense to form hexaphenylcyclodisilazane. After the mixture has cooled, it is treated with 40 parts of heptane to dissolve the o-diphenylbenzene reaction solvent. The hexaphenylcyclodisilazane is recovered in 96 percent yield as the residue of the heptane extraction. The melting point of the crude product is 344–348° C.

EXAMPLE 7

*Synthesis of Hexaphenylcyclodisilazane*

To a solution of 488 parts of diphenylanilinosilane in 2500 parts of phenyl ether under nitrogen atmosphere one adds 0.49 part of a sodium hydride dispersion as catalyst. The solution is heated to the reflux temperature of the phenyl ether until hydrogen evolution ceases. The reaction mixture is then cooled and extracted with benzene. From the benzene extract one recovers hexaphenylcyclodisilazane in 62 percent yield. Its identity is confirmed by its M.P. (352° C.) and by its infrared spectrum. (See Example 10.)

EXAMPLE 8

*Synthesis of Hexaphenylcyclodisilazane*

A mixture of 2 parts of diphenyldianilinosilane, 1 part of diphenylsilane, and 0.05 part of $NaNH_2$ catalyst is dissolved in 2 parts of biphenyl and heated in a flask under $N_2$ atmosphere to 255° C. Vigorous evolution of hydrogen occurs. After hydrogen evolution ceases, the reaction mixture is cooled and 10 parts of heptane are added to dissolve the biphenyl. The heptane-insoluble crystals are extracted twice with benzene. The benzene extract deposits crystals of hexaphenylcyclodisilazane identifiable by X-ray analysis. (See Example 10.)

EXAMPLE 9

*Synthesis of N,N'-Di(2-Pyridyl)Tetraphenylcyclodisilazane*

A mixture of 197.3 parts of hexaphenylcyclotrisilazane, 94.1 parts of 2-aminopyridine, and 500 parts of o-diphenylbenzene is heated under nitrogen atmosphere to 335° C. and the evolved ammonia removed in the stream of nitrogen. Upon completion of the reaction, the mixture is allowed to cool. It deposits crystals during the cooling process. The mixture is then dissolved in 4000 parts of hot benzene and set aside to cool. Crystals of N,N'-di(2-pyridyl)tetraphenylcyclodisilazane, M.P. 332–334° C., separate from the cool benzene solution. The compound exhibits pronounced absorbance in the infrared region at the following wave-lengths ($\pm 0.1\mu$): $6.3\mu$, $6.8\mu$, $7.0\mu$, $7.5\mu$, $8.9\mu$, $10.1\mu$, $10.4\mu$, $11.2\mu$, $12.8\mu$, $13.6\mu$, $13.8\mu$, and $14.2\mu$. The spectrum is consistent for the structure of N,N'-di(2-pyridyl)tetraphenylcyclodisilazane.

EXAMPLE 10

*Synthesis of Hexaphenylcyclodisilazane*

To a mixture of 20 parts of diphenylsilane and 10 parts of aniline in a flask is added 1 part of powdered copper and the system filled with nitrogen. Heating the mixture causes vigorous evolution of hydrogen accompanied by a spontaneous generation of heat in the reaction mass. As the mass is heated, the temperature rises progressively finally reaching 440° C. under atmospheric pressure. At this stage the mixture refluxes without further rise in temperature. The reaction mixture solidifies on cooling to a stiff, sticky mass.

Extraction of the reaction product with benzene removes the small amount of sticky, polymeric product and leaves a mixture of crystals of copper silicide from the original catalyst and colorless crystals of hexaphenylcyclodisilazane. This compound begins to sublime at 330° C. and melts at 352–354° C. Molecular weight calculated for $C_{36}H_{30}N_2Si_2 = 546.74$; found = 555.

*Analysis.*—Calculated for $C_{36}H_{30}N_2Si_2$: C, 79%; H, 5.5%; Si, 10.3%. Found: C, 77.4%; H, 5.5%; Si, 10.3%. The compound exhibits pronounced absorbance in the infrared region at the following wave-lengths ($\pm 0.1\mu$): $6.3\mu$, $6.7\mu$, $7.0\mu$, $7.7\mu$, $9.0\mu$, $10.0\mu$, $10.6\mu$, $11.3\mu$, $13.3\mu$, $13.5\mu$, $13.9\mu$, $14.4\mu$, and $14.6\mu$. The spectrum is consistent for the structure of hexaphenylcyclodisilazane.

Hexaphenylcyclodisilazane gives an X-ray spectrum characterized by the following lines of major intensity.

| d-Values: | Relative Intensity |
|---|---|
| 9.52 | 25 |
| 8.37 | 100 |
| 7.27 | 80 |
| 4.90 | 40 |
| 4.72 | 50 |
| 4.32 | 70 |
| 4.10 | 40 |
| 3.80 | 25 |

EXAMPLE 11

*Synthesis of N,N'-Di-(p-Methoxyphenyl)Tetraphenylcyclodisilazane*

A mixture of 184 parts diphenylsilane, 125 parts p-anisidine, and 0.2 part sodium hydride is heated under nitrogen atmosphere until evolution of hydrogen from the reaction ceases completely. The reaction mixture is allowed to cool partially, but while it is still molten, an excess of heptane is added to it to precipitate the product. The crystalline product is washed with more heptane and then recrystallized from xylene. The N,N'-di-(p-methoxyphenyl)tetraphenylcyclodisilazane so purified melts at 289–291° C. The compound exhibits pronounced absorbance in the infrared region at the following wave-lengths: $6.6\mu$, $7.0\mu$, $7.7\mu$, $7.9\mu$, $8.1\mu$, $8.5\mu$, $9.0\mu$, $9.6\mu$, $10.6\mu$, $11.3\mu$, $12.2\mu$, $12.7\mu$, $13.5\mu$, $13.9\mu$, and $14.4\mu$. The spectrum is consistent for the structure of N,N'-di-(p-methoxyphenyl)tetraphenylcyclodisilazane.

EXAMPLE 12

*Synthesis of N,N'-Bis(3,5-Dimethylphenyl)Tetraphenylcyclodisilazane*

A mixture of 184 parts diphenylsilane, 125 parts 3,5-dimethylaniline, 500 parts of phenyl ether and 0.1 part sodium hydride is heated under reflux in a nitrogen atmosphere. After two hours hydrogen evolution ceases, and the reaction mixture is allowed to cool. Crystals begin to deposit around 100° C. The crystals, washed with benzene to remove phenyl ether solvent, melt at 300–301° C. This compound, N,N'-bis(3,5-dimethylphenyl)tetraphenylcyclodisilazane, exhibits pronounced absorbance in the infrared region at the following wave-lengths ($\pm 0.1\mu$): $6.3\mu$, $7.0\mu$, $7.5\mu$, $8.4\mu$, $9.0\mu$, $9.1\mu$, $9.4\mu$, $10.4\mu$, $11.4\mu$, $11.6\mu$, $12.1\mu$, $12.5\mu$, $13.6\mu$, $14.0\mu$, and $14.4\mu$. The spectrum is consistent for the structure of N,N'-bis(3,5-dimethylphenyl)tetraphenylcyclodisilazane.

EXAMPLE 13

*Synthesis of N,N'-Dicyclohexyltetraphenylcyclodisilazane*

A mixture of 106 parts of cyclohexylamine, 184 parts of diphenylsilane, 535 parts of phenyl ethers, and 0.1 part of sodium hydride is refluxed under nitrogen atmosphere for two hours and then cooled to room temperature. On standing for several days, the reaction mixture deposits crystals of N,N'-cyclohexyltetraphenylcyclodisilazane. This compound exhibits pronounced absorbance in the infrared region at the following wave-lengths ($\pm 0.1\mu$): $6.9\mu$, $7.0\mu$, $7.3\mu$, $7.9\mu$, $8.6\mu$, $9.0\mu$, $10.1\mu$, $10.8\mu$, $11.2\mu$, $11.8\mu$, $12.4\mu$, $13.7\mu$, $14.1\mu$, and $14.4\mu$. The spectrum is consistent for the structure of N,N'-cyclohexyltetraphenylcyclodisilazane.

EXAMPLE 14

*Synthesis of N,N'-Diethyltetraphenylcyclodisilazane*

Gaseous, anhydrous ethylamine is bubbled through a solution of 184 parts of diphenyldichlorosilane in 2830 parts of ethyl ether, until precipitation of ethylamine hydrochloride is complete and no more ethylamine is absorbed. The solid amine salt is removed by filtration, and the filtrate is then further treated with ethylamine to assure completion of the reaction. The ether is then distilled off the bis(ethylamino)diphenylsilane, and 71 parts of o-diphenylbenzene is added as a thermo-regulating solvent for the condensation reaction of the bis(ethylamino)diphenylsilane. The mixture is heated to reflux under nitrogen atmosphere, and the liberated ethylamine is removed from the system. After refluxing for 8 hours at a temperature of 330–335° C., the mixture is allowed to cool to room temperature. Crystals of N,N′-diethyltetraphenylcyclodisilazane slowly deposit from the reaction mixture. These crystals exhibit pronounced absorbance in the infrared region at the following wave-lengths ($\pm 0.1\mu$): $3.4\mu$, $7.0\mu$, $7.3\mu$, $8.6\mu$, $9.0\mu$, $9.1\mu$, $10.6\mu$, $11.8\mu$, $12.9\mu$, $13.5\mu$, $13.6\mu$, $14.1\mu$, and $14.4\mu$. The spectrum is consistent for the structure of N,N′-diethyltetraphenylcyclodisilazane.

EXAMPLE 15

*Synthesis of N,N′-Di-3-Quinolyltetraphenylcyclodisilazane*

A mixture of 146 parts 3-aminoquinoline, 184 parts diphenylsilane, 500 parts phenyl ether, and 0.1 part sodium hydride is heated under nitrogen atmosphere, until hydrogen evolution is complete. Crystals deposit from the reaction mixture as it is cooled. The reaction mixture is extracted with benzene and the benzene-insoluble portion then extracted with xylene. The hot xylene extract deposits crystals melting in the range 347–350° C. The crystals exhibit pronounced absorbance in the infrared region at the following wave-lengths ($\pm 0.1\mu$): $6.2\mu$, $6.8\mu$, $7.0\mu$, $7.4\mu$, $7.8\mu$, $8.2\mu$, $8.4\mu$, $9.0\mu$, $9.1\mu$, $10.0\mu$, $10.7\mu$, $11.4\mu$, $11.5\mu$, $12.0\mu$, $13.4\mu$, $13.5\mu$, $13.6\mu$, $14.0\mu$, and $14.4\mu$. The spectrum is consistent with the structure of N,N′-di-3-quinolyltetraphenylcyclodisilazane.

The claims are:
1. Compounds of the formula:

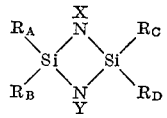

wherein X and Y are each selected from the group consisting of lower alkyl, cycloalkyl of 5 through 11 carbon atoms, aryl of 6 through 13 carbon atoms, pyridyl and quinolyl, and $R_A$, $R_B$, $R_C$ and $R_D$ are each selected from the group consisting of alkyl, cycloalkyl of 5 through 7 carbon atoms, aryl of 6 through 13 carbon atoms, aralkyl of 7 through 11 carbon atoms, alkoxyalkyl of 2 through 9 carbon atoms, phenoxyphenyl of 12 through 18 carbon atoms, pyridyl and quinolyl.

2. N,N′-Di-(p-tolyl)tetraphenylcyclodisilazane.
3. N,N′-Di-(p-tolyl)tetramethylcyclodisilazane.
4. N,N′-Dimethyltetraphenylcyclodisilazane.
5. N,N′ - Si,Si′ - tetraphenyl - Si,Si′ - dimethylcyclodisilazane.
6. Hexaphenylcyclodisilazane.
7. N,N′-Di(2-pyridyl)tetraphenylcyclodisilazane.
8. N,N′,Si,Si - tetraphenyl - Si′,Si′ - dimethylcyclodisilazane.
9. N,N′ - Di - (p-methoxyphenyl)tetraphenylcyclodisilazane.
10. N,N′ - Bis(3,5 - dimethylphenyl)tetraphenylcyclodisilazane.
11. N,N′-Dicyclohexyltetraphenylcyclodisilazane.
12. N,N′-Diethyltetraphenylcyclodisilazane.
13. N,N′-Di-3-quinolyltetraphenylcyclodisilazane.
14. In a method for preparing substituted cyclodisilazane compounds, the step of reacting in liquid phase a hydrosilane of the formula:

$$R_A R_B SiH_2$$

wherein $R_A$ and $R_B$ are selected from the group consisting of alkyl, cycloalkyl containing from 5 through 7 carbon atoms each, aryl containing from 6 through 13 carbon atoms each, aralkyl radicals containing from 7 through 11 carbon atoms each, alkoxyalkyl containing from 2 through 9 carbon atoms each, phenoxyphenyl containing from 12 through 18 carbon atoms each, pyridyl, and quinolyl, with an amine of the formula: $XNH_2$ wherein X is selected from the group consisting of cyclohexyl, phenyl, benzyl, tolyl, xylyl, 2-pyridyl, and quinolyl, said reaction being carried out in an oxygen-free atmosphere at a temperature in the range from 150° C. up to the decomposition temperature of the particuar amine used.

15. The method of claim 14 wherein the reaction is carried out in the presence of a catalyst selected from the group consisting of copper, silver, nickel, platinum, ammono bases, hydrides of Group IA Metals, Group IA Metals, lithium aluminum hydride and butyl lithium.

No references cited.

UNITED STATES PATENT OFFICE
CERTIFICATE OF CORRECTION

Patent No. 3,140,288　　　　　　　　　　　　　　July 7, 1964

John S. Peake

It is hereby certified that error appears in the above numbered patent requiring correction and that the said Letters Patent should read as corrected below.

Column 5, lines 11 to 15, for the right-hand portion of the formula reading $$2H_G NH_2 \quad\quad read \quad\quad 2R_G NH_2$$

column 6, lines 4 to 7, the formula should appear as shown below instead of as in the patent:

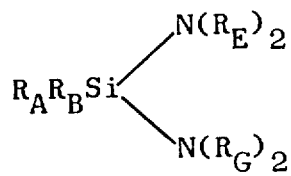

same column 6, lines 36 to 40, the left-hand portion of the formula should appear as shown below instead of as in the patent:

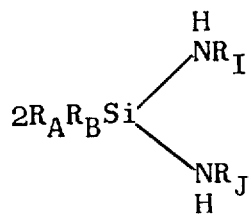

Signed and sealed this 30th day of March 1965.

(SEAL)
Attest:

ERNEST W. SWIDER　　　　　　　　　　　EDWARD J. BRENNER
Attesting Officer　　　　　　　　　　　Commissioner of Patents